(12) United States Patent
Saito et al.

(10) Patent No.: US 7,567,793 B1
(45) Date of Patent: Jul. 28, 2009

(54) INFORMATION SYSTEM, MOBILE COMMUNICATION TERMINAL, AND INFORMATION METHOD

(75) Inventors: Hiroji Saito, Tokyo (JP); Tatsuji Nagaoka, Sapporo (JP); Tomoko Matsuura, Tokyo (JP); Mariko Wakaizumi, Tokyo (JP)

(73) Assignees: NTT Advanced Technology Corporation, Tokyo (JP); NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 09/889,841

(22) PCT Filed: Nov. 22, 2000

(86) PCT No.: PCT/JP00/08230

§ 371 (c)(1),
(2), (4) Date: Jul. 20, 2001

(87) PCT Pub. No.: WO01/39411

PCT Pub. Date: May 31, 2001

(30) Foreign Application Priority Data

Nov. 22, 1999 (JP) .................................. 11-331771

(51) Int. Cl.
*G06F 15/16* (2006.01)
(52) U.S. Cl. .................................... 455/403; 455/414.1
(58) Field of Classification Search ................ 455/3.04, 455/3.06, 3.03, 414.1
See application file for complete search history.

(56) References Cited

U.S. PATENT DOCUMENTS

| 5,285,272 A | * | 2/1994 | Bradley et al. .............. 725/115 |
| 5,504,933 A | | 4/1996 | Saito |
| 5,689,081 A | * | 11/1997 | Tsurumi ....................... 84/609 |
| 5,694,455 A | * | 12/1997 | Goodman .................... 455/413 |
| 5,729,549 A | | 3/1998 | Kostreski et al. |
| 5,812,930 A | | 9/1998 | Zavrel |
| 5,959,945 A | * | 9/1999 | Kleiman ....................... 381/81 |

(Continued)

FOREIGN PATENT DOCUMENTS

CN 1194514 A 9/1998

(Continued)

*Primary Examiner*—Sam Bhattacharya
(74) *Attorney, Agent, or Firm*—Brinks Hofer Gilson & Lione

(57) ABSTRACT

A user sends a request signal to a delivery management server 60 by utilizing a mobile station 10 in response to a broadcast service provided by a broadcast station 70. The request signal includes a music song ID of music song data segments which the user wants to be delivered and also an address of the destination to which the music song data segments be delivered. Upon the receipt of the request signal, the delivery management server 60 returns, in the case of unpopular songs, the music song data segments and a decrypting key for decrypting the data segments, and on the other hand, it returns, in the case of popular songs, only the decrypting key to the mobile station 10 or a STB 40. The mobile station 10 or the STB 40 decodes, in the case of unpopular songs, the music song data segments received from the delivery management server 60 by utilizing the decrypting key therefor and on the other hand, it receives, in the case of popular songs, the music song data segments in the broadcast waves provided from the broadcast station 70 and then decrypts data segments by utilizing the decrypting key received from the delivery management server 60.

14 Claims, 14 Drawing Sheets

U.S. PATENT DOCUMENTS

| | | | |
|---|---|---|---|
| 6,366,698 B1 | 4/2002 | Yamakita | |
| 6,606,502 B1 * | 8/2003 | Chung Kam Chung et al. | 455/466 |
| 6,625,458 B2 * | 9/2003 | Pihl et al. | 455/456.1 |
| 2002/0068554 A1 * | 6/2002 | Dusse | 455/419 |

FOREIGN PATENT DOCUMENTS

| | | |
|---|---|---|
| CN | 1209017 A | 2/1999 |
| DE | 44 24 380 A | 1/1996 |
| DE | 44 24 380 A1 | 1/1996 |
| EP | 0 731 572 A2 | 9/1996 |
| EP | 0 831 608 | 3/1998 |
| EP | 0 899 956 A2 | 3/1999 |
| JP | H05-115063 | 5/1993 |
| JP | H05-235877 | 9/1993 |
| JP | H06-098323 | 4/1994 |
| JP | H06-141004 | 5/1994 |
| JP | H06-152501 | 5/1994 |
| JP | H08-097854 | 4/1996 |
| JP | H08-186548 | 7/1996 |
| JP | H 08-221087 | 8/1996 |
| JP | H08-242213 | 9/1996 |
| JP | H08-289348 | 11/1996 |
| JP | H08-307921 | 11/1996 |
| JP | H09-205636 | 8/1997 |
| JP | H 09-282278 | 10/1997 |
| JP | H09-282278 | 10/1997 |
| JP | H10-051404 | 2/1998 |
| JP | H 10-136123 | 5/1998 |
| JP | H10-200493 | 7/1998 |
| JP | H 10-200493 | 7/1998 |
| JP | H10-276311 | 10/1998 |
| JP | H11-112651 | 4/1999 |
| JP | H 11-164058 | 6/1999 |
| JP | H 11-266483 | 9/1999 |
| WO | WO 98/10580 | 3/1998 |
| WO | WO 98 36552 A | 8/1998 |
| WO | WO 98/56181 | 12/1998 |
| WO | WO 99 04568 A | 1/1999 |

* cited by examiner

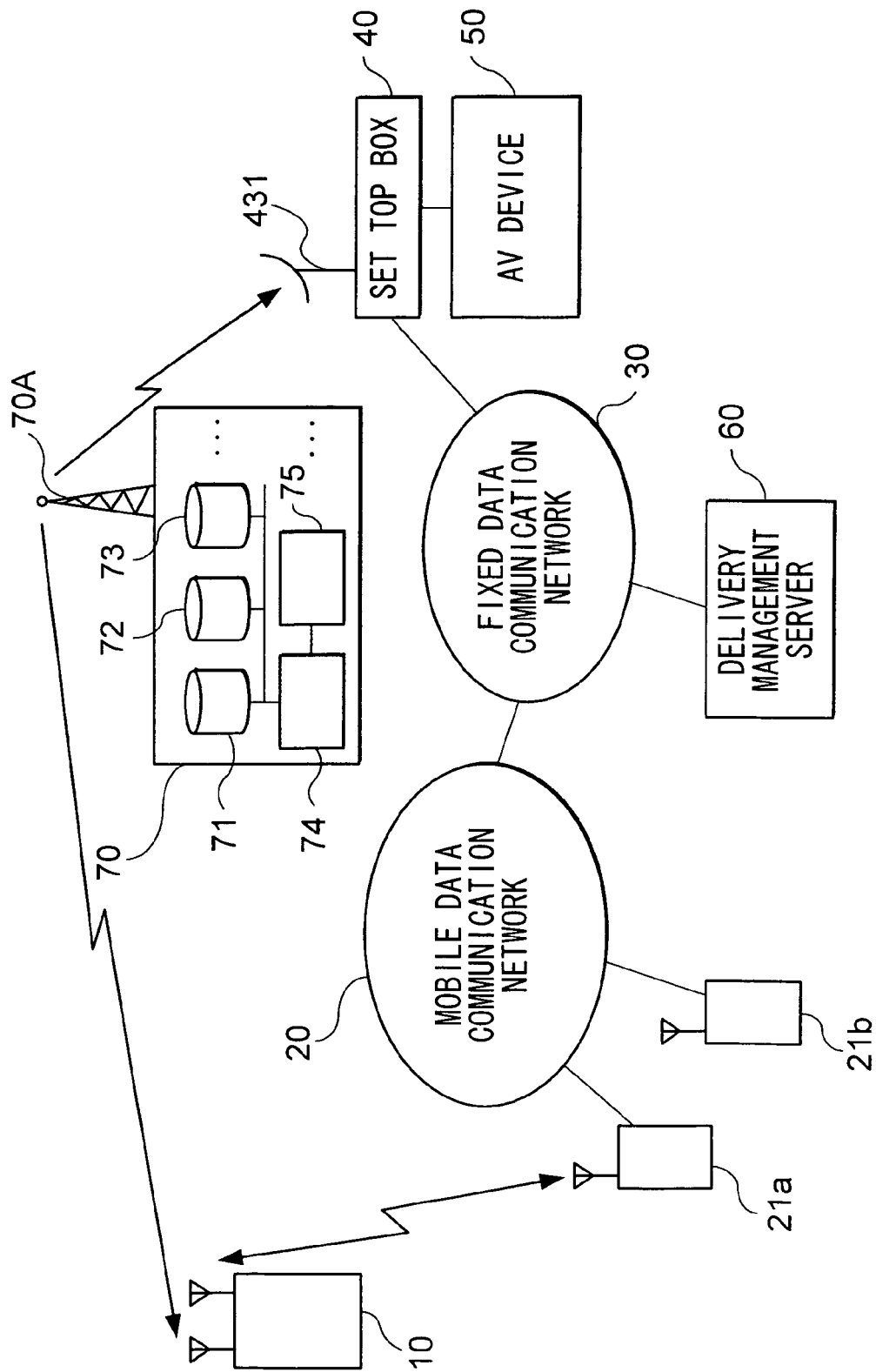

FIG. 2

| MUSIC SONG ID | MUSIC SONG DATA SEGMENTS |
|---|---|
| m0001 | MUSIC SONG DATA SEGMENTS (POPULAR SONG) |
| m0002 | MUSIC SONG DATA SEGMETNS (UNPOPULAR SONG) |
| m0003 | MUSIC SONG DATA SEGMETNS (UNPOPULAR SONG) |
| m0004 | MUSIC SONG DATA SEGMENTS (POPULAR SONG) |
| m0005 | MUSIC SONG DATA SEGMETNS (UNPOPULAR SONG) |
| ..... | .......... |
| ..... | .......... |

FIG. 3

| MUSIC SONG ID | MUSIC SONG DATA SEGMENTS |
|---|---|
| m0001 | MUSIC SONG DATA SEGMENTS (POPULAR SONG) |
| m0004 | MUSIC SONG DATA SEGMENTS (POPULAR SONG) |
| ..... | .......... |
| ..... | .......... |
| ..... | .......... |
| ..... | .......... |
| ..... | .......... |

FIG. 4

| MUSIC SONG ID | MUSIC SONG DATA SEGMENTS |
|---|---|
| m0001 | TEST-LISTEN DATA SEGMENTS (POPULAR SONG) |
| m0004 | TEST-LISTEN DATA SEGMENTS (POPULAR SONG) |
| ..... | .......... |
| ..... | .......... |
| ..... | .......... |
| ..... | .......... |
| ..... | .......... |

FIG. 5

| mch1 | MX1 | ... | MXn | MX1 | ... |
|---|---|---|---|---|---|
| mch2 | MS1 | ... MSn | MS1 | ... MSn | MS1 |

FIG. 9

| MUSIC SONG ID | NUMBER OF DELIVERY OPERATIONS |
|---|---|
| m0001 | 12 |
| m0002 | 135 |
| m0003 | 2 |
| ..... | ........... |
| ..... | ........... |
| ..... | ........... |
| ..... | ........... |

INFORMATION SYSTEM, MOBILE COMMUNICATION TERMINAL, AND INFORMATION METHOD

TECHNICAL FIELD

The present invention relates to an information delivery system, mobile communication terminal and information delivery method well-suited for use in service of delivering the contents such as the music information.

BACKGROUND ART

A network such as the internet has been making remarkable progress. In recent years, various kinds of systems which utilize the network to provide information delivery service has been proposed. As such systems, for example, the following system is known, that is, a system for establishing homepages, which provides the contents such as music software and game software on the WWW (World Wide Web) of the internet, so that a user of a personal computer connected to the internet can access the homepages to select desired contents and download the selected contents to the personal computer of the user.

Further, in recent years, the broadcast operation is becoming more digitized, and a system providing the contents by utilizing the digital broadcast has been proposed.

However, Users who request the contents are not always in the same place, but are sometimes at home or moving on. Therefore, it is convenient for users if they can request the contents anywhere and anytime. Also, even when the users request to obtain the contents, there may be a case where they desire the contents to be delivered at their present location, or may be a case where they desire the contents to be delivered at another location.

The present invention has been made in consideration of the above circumstances, and the object of it is to provide an information delivery system, a mobile communication terminal, and an information delivery method enabling the user to request the desired contents and to obtain the desired contents at the desired location without the limitation of the user's location and time.

DISCLOSURE OF INVENTION

An information delivery system of the present invention is characterized in that the system comprising: a database for storing information; an information delivery device for obtaining information to be delivered from said database to deliver said information to a specified destination to be delivered in response to a request; a mobile communication terminal served by a mobile communication network which is connected to said information delivery device, for requesting said information delivery device to deliver said information via said mobile communication network; and an information receiving terminal for receiving said information delivered from said information delivery device based on the request from said mobile communication terminal.

According to an another aspect of the present invention, an information delivery system of the present invention is characterized in that the system comprising: a database for storing first information with a high frequency of request and second information with a lower frequency of request as compared with said first information; a broadcast station for obtaining said first information from said database to deliver the first information by utilizing broadcast waves; an information delivery device for obtaining said second information from said database to deliver the second information in response to a request; a mobile communication terminal served by a mobile communication network which is connected to said information delivery device, for requesting said information delivery device to deliver said information via said mobile communication network; and an information receiving terminal including first receiving means for receiving said information broadcast from said broadcast station and second receiving means for receiving said information delivered from said information delivery device, said information receiving terminal receiving said first information by said first receiving means when said mobile communication terminal requests to deliver said first information, while said information receiving terminal receiving said second information by said second receiving means when said mobile communication terminal requests to deliver said second information.

According to an another aspect of the present invention, an information delivery system of the present invention is characterized in that the system comprising: a database for storing first information with a high frequency of request, second information with a lower frequency of request as compared with said first information and decrypting keys for decrypting said first information and said second information; a broadcast station for obtaining said first information from said database to deliver the first information by utilizing broadcast waves; an information delivery device for obtaining said second information and said decrypting keys from said database to deliver said second information and said decrypting keys in response to a request; a mobile communication terminal served by a mobile communication network which is connected to said information delivery device, for requesting said information delivery device to deliver said information via said mobile communication network; and an information receiving terminal including first receiving means for receiving information broadcast from said broadcast station and second receiving means for receiving information delivered from said information delivery device, said information receiving terminal receiving, when said mobile communication terminal requests to deliver said first information, said first information by said first receiving means and the decrypting keys for said first information by said second receiving means, while said information receiving terminal receiving, when said mobile communication terminal requests to deliver said second information, said second information and the decrypting keys therefor by said second receiving means.

According to an another aspect of the present invention, a mobile communication terminal of the present invention is characterized in that the terminal comprising: requesting means for requesting an information delivery device to deliver information, said device being connected to a mobile communication network; receiving means for receiving said information delivered from said information delivery device; and means for specifying, to said information delivery device, either said mobile communication terminal or another information receiving terminal capable of receiving said information as a destination to which said information is to be delivered.

According to an another aspect of the present invention, a mobile communication terminal of the present invention is characterized in that the terminal comprising: requesting means for requesting an information delivery device to deliver information, said device being connected to a mobile communication network; first receiving means for receiving first information broadcast from said broadcast station; second receiving means for receiving second information delivered from said information delivery device; and means for specifying, to said information delivery device, either said mobile communication terminal or another information receiving terminal capable of receiving said first and second information as a destination to which said information is to be delivered.

According to an another aspect of the present invention, an information delivery method of the present invention is characterized in that the method of delivering information stored in a database in response to a request from a mobile communication terminal served by a mobile communication network: the method comprising: a step in which an information delivery device receives a delivery request information, said delivery request information being transmitted from said mobile communication terminal and including specifying information for specifying a terminal to which information is to be delivered, and said information delivery device being connected to said mobile communication network via said mobile communication network; and a step of, when said delivery request information transmitted from said mobile communication terminal is received by said information delivery device, obtaining said information to be delivered from said database and transmitting the obtained information from said information delivery device to said terminal to which such information is to be delivered, said terminal being specified by said specifying information included in said delivery request information.

According to an another aspect of the present invention, an information delivery method of the present invention is characterized in that the method of delivering first information with a high frequency of request and second information with a lower frequency of request as compared with said first information stored in a database, in response to a request from a mobile communication terminal served by a mobile communication network: the method comprising: a step in which an information delivery device receives a delivery request information, said delivery request information being transmitted from said mobile communication terminal and including specifying information for specifying a terminal to which information is to be delivered, and said information delivery device being connected to said mobile communication network via said mobile communication network; and a step of, when said delivery request information transmitted from said mobile communication terminal for requesting to deliver said first information is received by said information delivery device, obtaining said first information to be delivered from said database and transmitting the first information from a broadcast station by utilizing broadcast waves, while when said delivery request information transmitted from said mobile communication terminal for requesting to deliver said second information is received by said information delivery device, obtaining said second information to be delivered from said database and transmitting the second information from said information delivery device to said terminal to which such information is to be delivered, said terminal being specified by said specifying information included in said delivery request information.

According to an another aspect of the present invention, an information delivery method of the present invention is characterized in that the method of delivering first information with a high frequency of request and second information with a lower frequency of request as compared with said first information stored in a database, in response to a request from a mobile communication terminal served by a mobile communication network: the method comprising: a step in which an information delivery device receives a delivery request information, said delivery request information being transmitted from said mobile communication terminal and including specifying information for specifying a terminal to which information is to be delivered, and said information delivery device being connected to said mobile communication network via said mobile communication network; and a step of, when said delivery request information transmitted from said mobile communication terminal for requesting to deliver said first information is received by said information delivery device, obtaining said first information to be delivered from said database and transmitting the first information from a broadcast station by utilizing broadcast waves, encrypting said obtained first information to deliver them from a broadcast station by utilizing broadcast waves, and transmitting decrypting keys for decrypting said encrypted first information from said information delivery device to said terminal to which said information is to be delivered, said terminal being specified by said specifying information included in said delivery request information, while when said delivery request information transmitted from said mobile communication terminal for requesting to deliver said second information is received by said information delivery device, obtaining said second information to be delivered from said database, encrypting said obtained second information and transmitting them together with a decrypting key for decoding said encrypted second information from said information delivery device to said terminal to which said information is to be delivered, said terminal being specified by said specifying information included in said delivery request information.

BRIEF DESCRIPTION OF DRAWINGS

FIG. 1 is a block diagram showing a configuration of an entire information delivery system according to a first embodiment of the present invention.

FIG. 2 is a format diagram showing an example of a music song database according to the first embodiment.

FIG. 3 is a format diagram showing an example of a popular song database according to the first embodiment.

FIG. 4 is a format diagram showing an example of a test-listen database according to the first embodiment.

FIG. 5 is a format diagram showing an example of a configuration of a broadcast channel relating to music delivery operations according to the first embodiment.

FIG. 9 is a format diagram showing an example of a delivery counting table according to the first embodiment.

BEST EMBODIMENT FOR CARRYING OUT THE INVENTION

Figure 6:
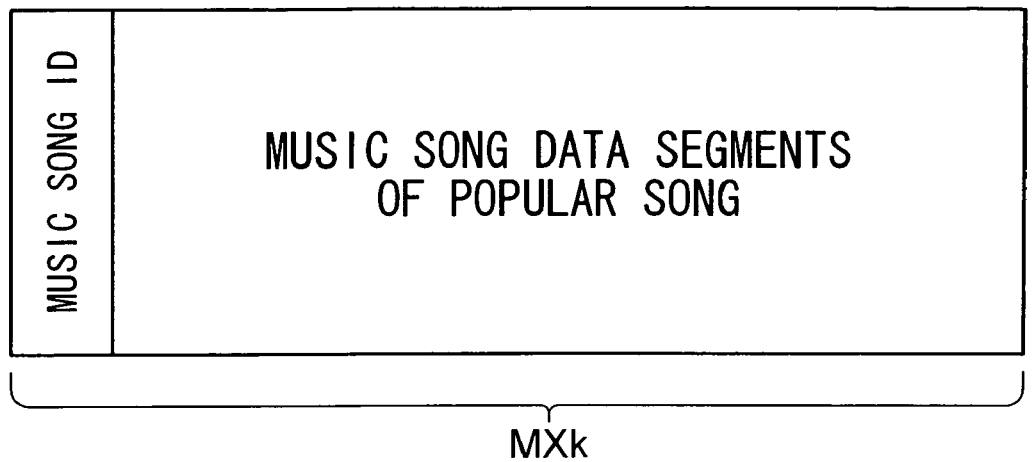
FIG. 6 is a format diagram showing an example of a configuration of a broadcast channel for music song data segments of popular songs according to the first embodiment.

In the following, referring to the attached drawings, description will be given on embodiments of the present invention. Although, in the embodiments explained below, the present invention is intended to be applied to an information delivery system for delivering music song data segments generated by digitally recording the performance of music songs, the present invention will not be limited to such embodiments, but, as will be explained below, various modifications can be made thereto within the scope of the present invention.

A. FIRST EMBODIMENT

Firstly, a first embodiment of the present invention will be explained.

A-1. Configuration (1) Configuration of the Entire System

FIG. 1 is a block diagram showing a configuration of an entire information delivery system according to a first embodiment. In this figure, the information delivery system includes a mobile station (mobile stations) 10, a mobile data communication network 20, a fixed data communication network 30, a set top box (abbreviated as "STB" hereinafter) 40, AV (audio visual) machine 50, a delivery management server 60 and a broadcast station 70.

The mobile station 10 is a mobile communication terminal such as portable telephones served by a mobile telephone network not shown and a mobile data communication network 20. That is, the mobile station 10 has a wireless communication function, and it can be provided with wireless communication service, being capable of making a wireless data communication via the mobile data communication network 20. The mobile station 10 also has a function of receiving ground wave digital broadcast service provided by the broadcast station 70.

The mobile data communication network 20 includes a number of base stations 21a, 21b . . . , switching stations not shown and communication lines connecting therebetween, thereby providing bi-directional wireless data communication service to the mobile station 10.

The fixed data communication network 30 is a bi-directional digital communication network such as the ISDN (Integrated Services Digital Network). The fixed data communication network 30 serves a number of fixed stations including the set top box 40, the delivery management server 60 and the broadcast station 70, thereby providing data communication service between these fixed stations. Further, the fixed data communication network 30 is connected to the mobile data communication network 20 via a gateway apparatus not shown so as to allow a data communication between fixed stations in the fixed data communication network 30 and the mobile station 10 served by the mobile data communication network 20.

The broadcast station 70 provides the ground wave digital broadcast service via a broadcast wave transmission antenna 70A. The ground wave digital broadcast service includes a broadcast channel for providing music delivery service as well as a broadcast channel for providing various types of radio programs and television programs. Also, the broadcast station 70 has a group of databases for storing the contents to be provided through various types of broadcast services, the group including the databases 71 to 73 for providing the music delivery service in particular; a database management system 74 for managing updates to the databases group; and a server system 75 for providing the music delivery service via the broadcast wave transmission antenna 70A and the delivery management server 60 in the fixed data communication network 30. The server system 75 encrypts, when carrying out the music delivery operations, data segments to be delivered by utilizing a predetermined encryption system, and it also produces a decryption key for decrypting each encrypted delivery data segment to provide it to the delivery management server 60.

The delivery management server 60 obtains information necessary for providing the music delivery service, from the broadcast station 70 via the fixed data communication network 30, so as to provide the music delivery service to the mobile stations 10 and the fixed stations such as the STB 40. Further, the delivery management server 60 stores billing data segments and delivery log data segments which are generated along with the provision of the music delivery service.

The STB 40 is an information communication terminal for receiving ground wave digital broadcast waves provided from the broadcast station 70 as well as making a bi-directional data communication via the fixed data communication network. The STB 40 having an antenna 431 for receiving the broadcast waves is connected to the AV device 50 and the fixed data communication network 30. That is, the STB 40 demodulates or decrypts the broadcast waves received by the broadcast wave receiving antenna 431, and outputs the resultant broadcast waves to the AV device 50 for reproducing them as a picture and voice. The STB 40 demodulates or decrypts the music song data segments provided via the fixed data communication network 30 and outputs them to the AV device 50 in a like manner.

The AV device 50 reproduces the contents as a picture and voice, the contents including such as television programs and music delivery programs received via the STB 40.

(2) Details of the Databases Provided in Broadcast Station 70

The broadcast station 70 has databases (abbreviated as "DB" hereinafter) for providing the music delivery service, including the music song DB 71, the popular song DB 72 and the test-listen DB 73.

FIG. 2 is a format diagram showing an example of the data segments stored in the music song DB 71. As shown in the figure, the music song DB 71 stores a number of music song data segments and music song IDs used as identification information for uniquely specifying each song, the music song data segments and the music song IDs being related with each other. The term "music song data segments" refers to the data segments obtained by digitally recording the performance of music songs with the use of a predetermined audio compression encoding system such as the MPEG2 AAC (MPEG 2 Advanced Audio Coding).

FIG. 3 is a format diagram showing an example of data segments stored in the popular song DB 72. As shown in the figure, the popular song DB 72 stores music song data segments of the popular songs and music song IDs for each of the popular songs, which are related with each other. The term "popular songs" refers to the music songs which has been delivered many times for a predetermined time period. For example, music songs ranked in the top 20 are referred to as "popular songs", and the remaining songs are referred to as "unpopular songs", which have been found by accumulating the number of the delivery operations of the music song data segments for each of such music songs every predetermined time period, for example, for the past one week and then ranking the accumulated delivery numbers in descending order. The popular song DB 72 is created by determining popular songs at fixed intervals based on the delivery log information provided from the delivery management server 60 and extracting only the data segments of the popular songs from the above described music song DB 71.

FIG. 4 is a format diagram showing an example of the data segments stored in the test-listen database 73. As shown in the figure, the test-listen DB 73 stores music song data segments for test-listen (referred to as "test-listen data segments" hereinafter) and music song IDs for each of the music songs, the music song data segments and the music song Ids being related with each other. The "test-listen data segments" are the music song data segments produced by extracting only the characteristic parts of the popular songs (for example, the introduction parts or refrain parts of the music songs). The data segments in the test-listen DB 73 can be decrypted/reproduced in the broadcast station 70 and be broadcast on a popular song test-listen channel for the music delivery service.

(3) Configuration of Broadcast Channel Relating to Music Delivery Service

Next, a configuration of the broadcast channel relating to the music delivery service, which is involved in the broadcast channels prepared by the broadcast station 70, will be explained.

FIG. 5 is a format diagram showing an example of the configuration of the broadcast channel relating to the music delivery service. As shown in the figure, the broadcast channel relating to the music delivery service has a channel "mch1" and a channel "mch2". On the channel "mch1", the music song data segments MX1 to MXn of the popular songs are circularly broadcast for the purpose of downloading. The music song data segments MX1 to MXn of the popular songs broadcast on the channel "mch1" are the data segments generated by encrypting the music song data segments which are read out from the popular song DB 72, with the use of a predetermined encrypting system. The reason why the music song data segments are encrypted before the broadcast operation thereof is to enable only a specified user to utilize such music song data segments, so that the specified user having the decrypting key is allowed to download the music song data segments, thus prohibiting an unspecified user, who is not allowed to download the music song data segments, from utilizing the music song data segments.

FIG. 6 is a format diagram showing the content of the music song data segment MXk for one song, of the music song data segments MX1 to MXn broadcast on the channel "mch1". As shown in the figure, at the head of the music song data segment MXk, the music song ID for specifying the song has been added.

On the other hand, on the channel "mch2", as shown in FIG. 5, the test-listen data segments MS1 to MSn are circularly broadcast for the purpose of test-listening to guide popular songs. The test-listen data segments MS1 to MSn broadcast on the channel "mch2" are the data segments obtained by reading the test-listen DB 73. As the object of the test-listen data segments MS1 to MSn is to guide popular songs, these test-listen data segments are broadcast without encrypting them.

Figure 7:
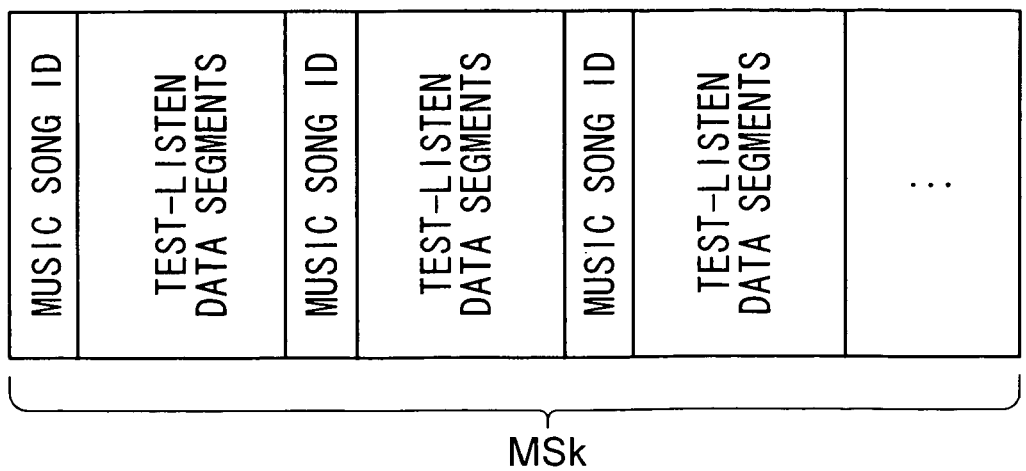
FIG. 7 is a format diagram showing an example of a configuration of a broadcast channel for test-listen data segments according to the first embodiment.

FIG. 7 is a format diagram showing the content of the test-listen data segment MSk for one song among the test-listen data segments MS1 to MSn broadcast on the channel "mch2". As shown in the figure, in the test-listen data segment MSk, the music song ID for specifying the music song has been inserted at predetermined time intervals, for example, 0.1 seconds etc.

(4) Configuration of the Delivery Management Server 60

Next, a configuration of the delivery management server 60 will be explained.

Figure 8:
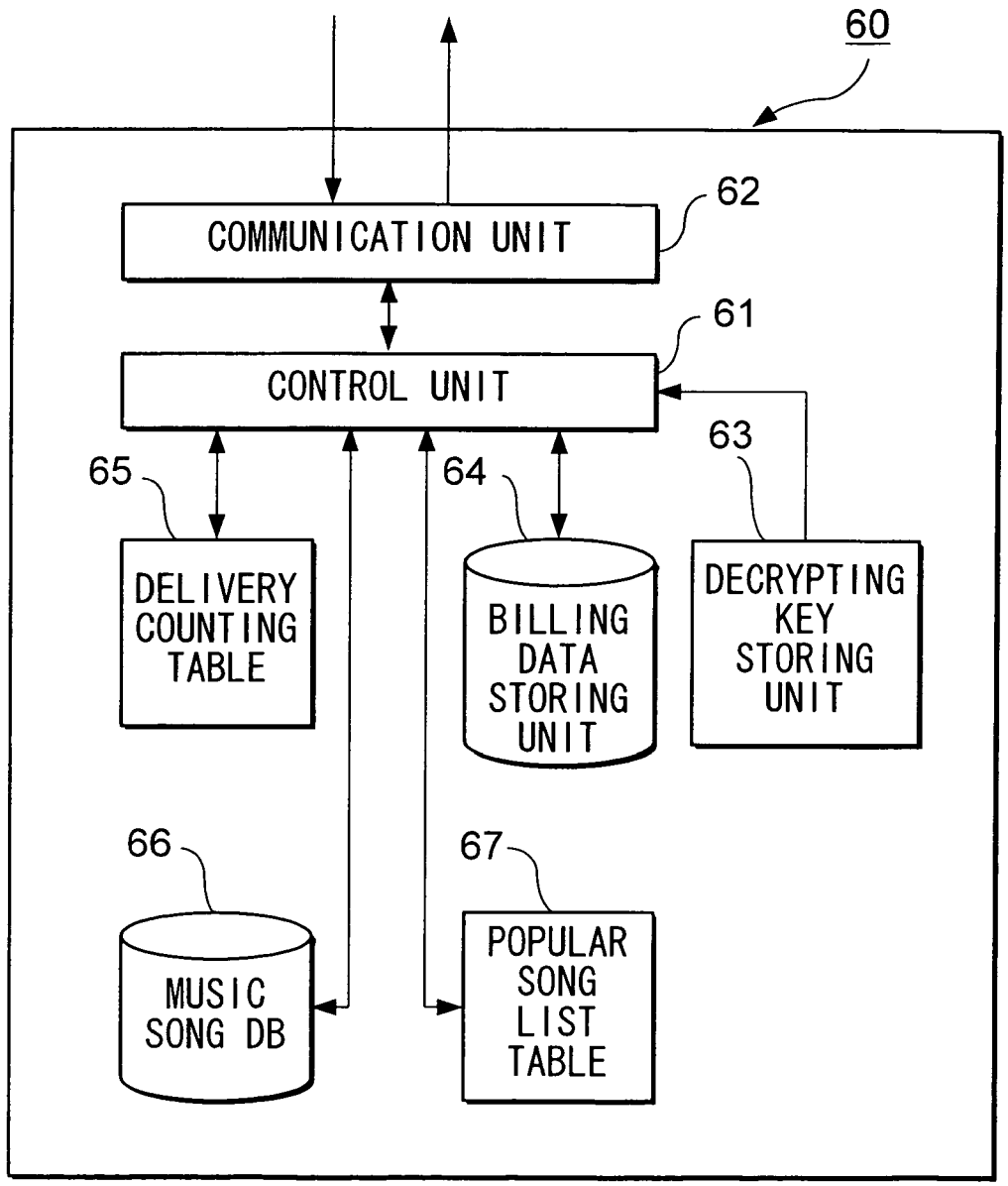
FIG. 8 is a block diagram showing a configuration of a delivery management server according to the first embodiment.

FIG. 8 is a block diagram showing the configuration of the delivery management server 60. As shown in the figure, the delivery management server 60 includes a control unit 61, a communication unit 62, a decrypting key storing unit 63, a billing data storing unit 64, a delivery counting table storing unit 65, a music song DB 66 and a popular song list table storing unit 67.

The control unit 61 includes a CPU (Central Processing Unit), a ROM (Read Only Memory), a RAM (Random Access Memory) and the like. The ROM stores control programs for providing the music delivery service, and the CPU executes the control programs so as to control each unit of the delivery management server 60 and to provide the music delivery service.

The communication unit 62 is connected to the fixed data communication network 30 and makes a data communication via the network 30. Through the use of this data communication, the delivery management server 60 obtains information necessary to provide the music delivery service and carries out music delivery operations corresponding to requests from the mobile station 10.

The decrypting key storing unit 63 stores the decrypting keys provided from the broadcast station 70. These decrypting keys are key information utilized for decrypting the encrypted music song data segments delivered to the user.

The music song DB 66 stores the same data segments as those in the above described music song DB 71 provided in the broadcast station 70. These data segments are provided from the broadcast station 70 via the fixed data communication network 30. The delivery management server 60 obtains the music song data segments requested by the mobile station 10 from the music song DB 66 and then transmits them to a specified destination to which they are to be delivered. The reason why the music song data segments should be transmitted to the specified destination is that such destination is not always the mobile station 10 which makes a request, but another receipt terminals such as the STB 40 can be specified as such destination.

The billing data storing unit 64 stores billing data segments necessary for billing for the provided music delivery service for each of the mobile stations 10 (i.e. for each of the users) which makes a request of the music delivery operations. The billing data segments are updated such that the billing amount of each of the provisions of the music delivery services can be accumulated each time such services are rendered.

The delivery counting table storing unit 65 stores a counting table for counting the number of delivery operations, the table having, as the delivery log data, information on an accumulated number of the delivery operations every predetermined time interval and for each of the music songs. FIG. 9 is a format diagram showing an example of the counting table for counting the number of the delivery operations. As shown in the figure, the delivery counting table stores, for each song, a music song ID and the number of the delivery operations thereof, which are related with each other. The delivery management server 60 increments the number of the delivery operations in the table every time a music delivery operation is processed. The delivery management server 60 determines popular songs based on the delivery counting table, the popular songs being those ranked in, for example, the top 20 in descending order of the number of the delivery operations. The music song IDs of the popular songs are stored in the popular song list table storing unit 67 and are informed to the broadcast station 70 via the fixed data communication network 30 or the like.

The popular song list table storing unit 67 stores a popular song list table having a list of music song IDs of the popular songs which are determined in the above described manner. When the delivery management server 60 receives a request signal from the mobile station 10, the server refers to the popular song list table and determines whether or not the music song ID included in the request signal is listed in the list of music song IDs of the popular songs. The delivery management server 60 controls the manners of the music delivery operations according to the results of the determination.

(4) Configuration of the Mobile Station 10

Next, the configuration of the mobile station 10 will be explained.

Figure 10:
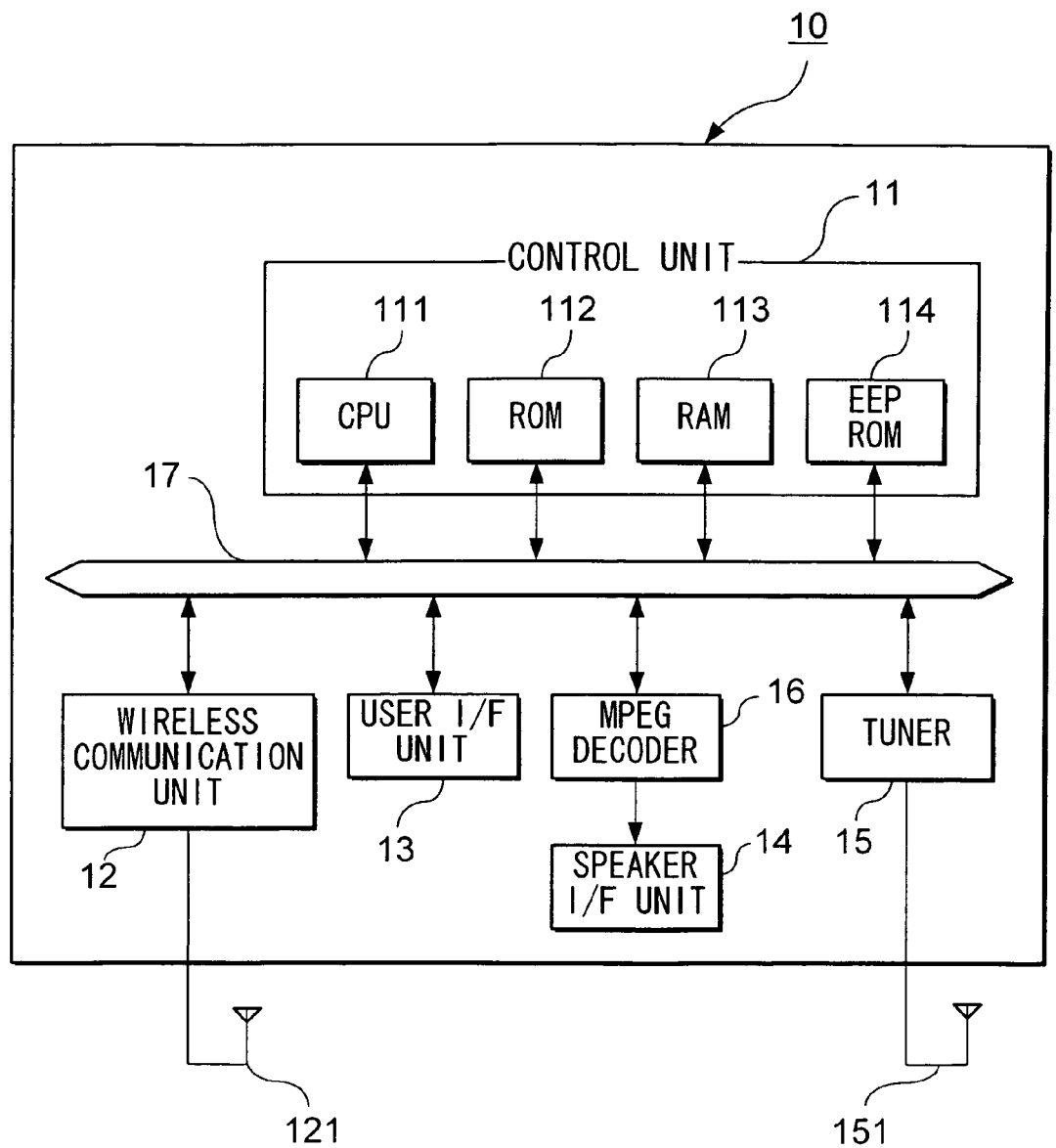
FIG. 10 is a block diagram showing a configuration of a mobile station according to the first embodiment.

FIG. 10 is a block diagram showing the configuration of the mobile station 10. As shown in the figure, the mobile station 10 includes a control unit 11, a wireless communication unit 12, a user interface unit 13 (abbreviated "interface" as "I/F" hereafter), a speaker I/F unit 14, a tuner 15, a MPEG decoder 16, and a bus 17 for mutually connecting the units.

The control unit 11 includes a CPU 11, a ROM 112, a RAM 113 and an EEPROM (Electrical Erasable Read Only Memory) 114, and controls each unit of the mobile station 10. The ROM 112 stores mobile station IDs for uniquely specifying the mobile stations 10 in the network (that is, the mobile data communication network 20 and the fixed data communication network 30) and various types of control programs. The CPU 111 executes the control programs to perform operations described below. The RAM 113 is used as a work area for the CPU 111. The EEPROM 114 stores music song data segments obtained by carrying out the music delivery operations, various types of information and the like. The music song data segments stored in the EEPROM 114 are the music song data segments to which the decrypting process has been carried out in the control unit 48 by utilizing the decrypting keys. The music song data segments to which the delivery service has been provided are stored in the EEPROM 114 and are read out in response to a request from user, being reproduced.

The wireless communication unit 12 communicates with the base stations 21a, 21b or the like of the mobile data communication network 20 via an antenna 121.

The user I/F unit 13 includes a liquid crystal display part, a key pad for carrying out various kinds of input operations, a microphone and a speaker enabling the user to make a telephone conversation and the like.

The tuner 15 tunes to the broadcast channel selected by the user and receives the selected broadcast waves via a broadcast wave receiving antenna 151 to demodulate the received waves. The received data segments resulting from demodulating the selected broadcast waves are transferred to the control unit 11 from the tuner 15. When the received data segments are encrypted music song data segments, these data segments are decrypted by utilizing the decrypting keys and then are stored into the EEPROM 114. The control unit 11 transfers the music song data segments stored in the EEPROM 114 to the MPEG decoder 16 in response to the user's request. On the other hand, in the case where the received data segments are the test-listen data segments which have not been encrypted, such data segments are transferred to the MPEG decoder 16 without performing particular processes thereto.

The MPEG decoder 16 decodes the received data segments transferred from the control unit 11 and outputs the resultant data segments to the speaker I/F unit 14.

The speaker I/F unit 14 is a voice output interface to which an external speaker such as headphone is connected. Digital voice signals given from the MPEG decoder 16 are D/A (digital/analog) converted via the speaker I/F unit 14 and then are provided to the external speaker, being reproduced as voice.

(5) Configuration of the STB 40

Next, the configuration of the STB 40 will be explained.

Figure 11:
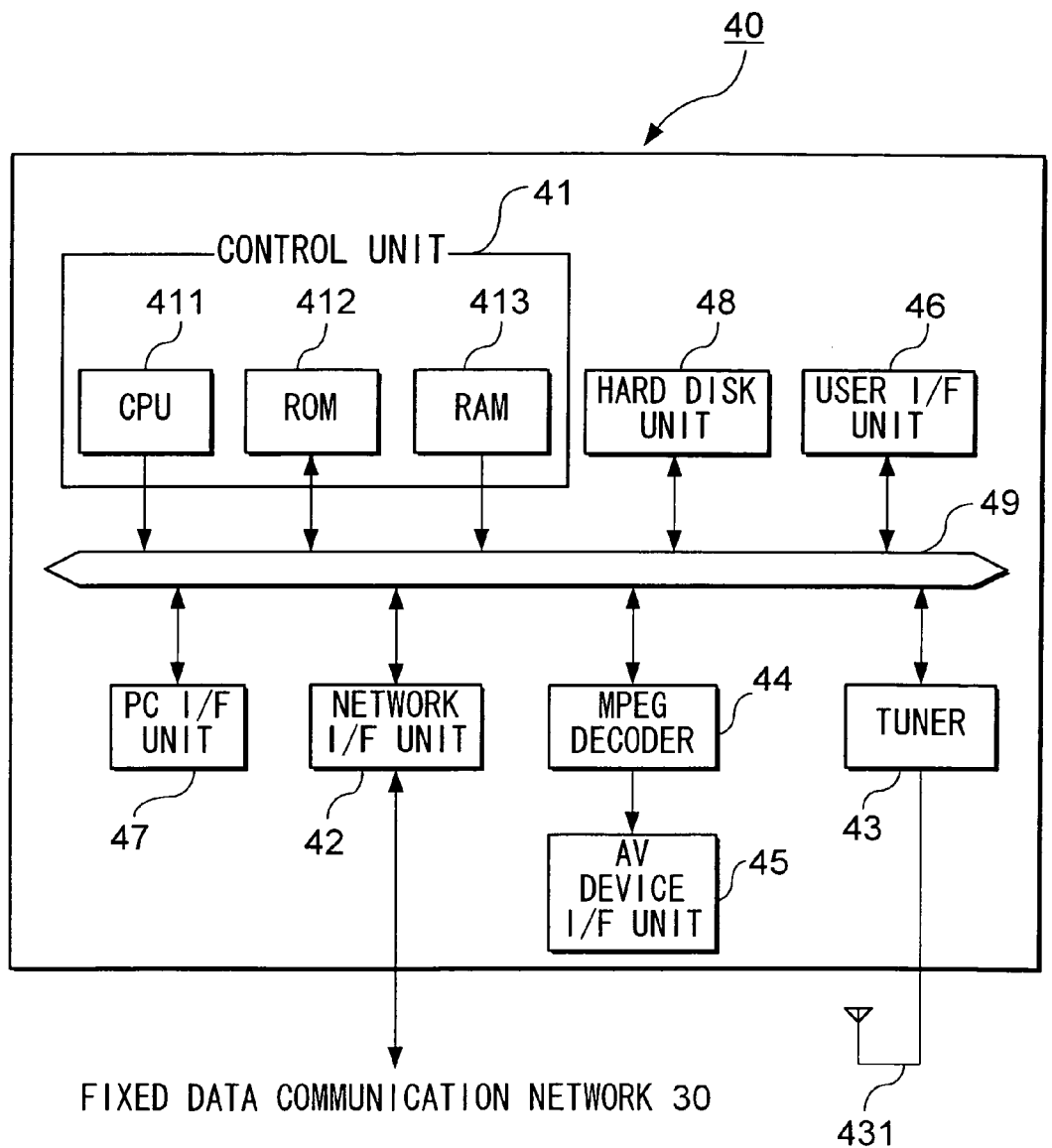
FIG. 11 is a block diagram showing a configuration of a set top box (STB) according to the first embodiment.

FIG. 11 is a block diagram showing the configuration of the STB 40. As shown in the figure, the STB 40 includes a control unit 41, a network I/F unit 42, a tuner 43, a MPEG decoder 44, an AV device I/F unit 45, a user I/F unit 46, a PC (personal Computer) I/F unit 47, a hard desk unit 48, and a bus 49 for mutually connecting the units.

The control unit 41 includes a CPU 411, a ROM 412 and a RAM 413, and controls each unit of the STB 40. The ROM 412 stores a STBID for uniquely specifying the STBs 40 in the network and various types of control programs. The CPU 411 executes the control programs to perform various types of control operations. The RAM 413 is used as a work area for the CPU 411.

In the case where the fixed data communication network 30 is, for example, an ISDN, the network I/F unit 42 includes a DSU (Digital Service Unit) and a TA (Terminal Adapter), so as to modulate and demodulate the received signals and to provide a communication interface with the fixed data communication network 30. The receive data obtained by demodulating the receive signals are transferred to the control unit 41, so that the receive data segments are processed, as in the case of the mobile station 10, depending on whether the data segments are encrypted or not, and then are provided to the MPEG decoder 44 or the hard disk unit 48.

The tuner 43 tunes to a broadcast channel selected by the user, receives broadcast waves via a broadcast wave receiving antenna 431 and carries out a demodulating process thereto. The received data segments resulting from demodulating the broadcast waves are transferred to the control unit 41, so that the received data segments are processed depending on whether or not the received data segments are encrypted, as in the case of the above described network I/F unit 42, and then are provided to the MPEG decoder 44 or the hard disk unit 48.

The MPEG decoder 44 decodes the received data segments transferred from the control unit 11 and outputs the resultant received data segments to the speaker I/F unit 45.

The AV device I/F unit 45 provides an interface with the AV device 50 connected to the STB 40. That is, the AV device I/F unit converts digital voice signals and picture signals provided by the MPEG decoder 44 to the analog signals reproducible by utilizing the AV device 50.

The user I/F unit 46 includes a remote controller which is used by the user for inputting operations, an infrared I/F connected with the remote controller, an operation panel for receiving inputting operations of the user, a display panel for displaying various kinds of information and the like.

The PC I/F unit 47 provides a connection interface connected with PCs such as RS-232. The STB 40 can input and output music song data segments via the PC I/F unit 47.

The hard disk unit 48 stores music song data segments obtained by the music delivery operations. The music song data segments stored in the hard disk unit 48 are the music song data segments to which the decrypting process has been carried out in the control unit 41 by utilizing decrypting keys. The music song data segments provided through the music delivery service are stored in the hard disk unit 48 and are read out in response to a request from the user, so as to be reproduced.

A-2: Operations

Referring now to FIGS. 12 to 15, the operations of the embodiments having the above configurations will be explained. The operations of the embodiments will be hereafter explained in the following order: (1) a request of the music delivery operations from the mobile station 10; (2) music delivery operations by the delivery management server 60; and (3) receipt of the music song data segments by the mobile station 10 or the STB 40.

(1) Request of the Music Delivery Operations from the Mobile Station 10

The request of the music delivery operations from the mobile station 10 includes: 1) a case where a desired song is requested based on the broadcast of the test-listen data segments and 2) the other case where a desired song is requested by accessing to the delivery management server 60. The case in the item 1) can be used to make a request of popular songs, and the case in the item 2) can be used to make a request of both popular songs and unpopular songs. These cases will be separately explained as follows.

Figure 12:
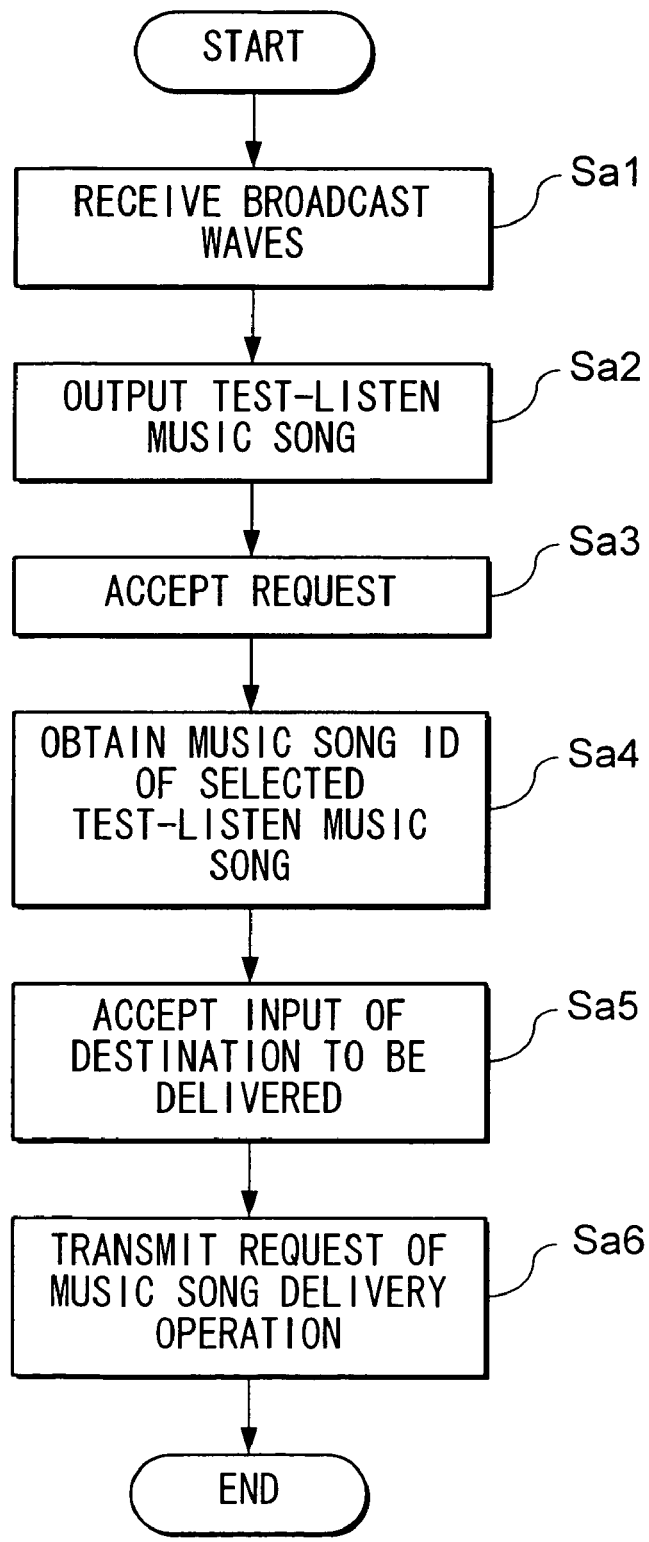
FIG. 12 is a flow chart illustrating an operation of the mobile station when requesting a desired song based on a broadcast of test-listen data segments in the first embodiment.

1) the case where the desired song is requested based on the broadcast of the test-listen data segments FIG. 12 is a flow chart illustrating an operation of the mobile station 10, when requesting the desired song based on a broadcast of the test-listen data segments.

As shown in the figure, first, when the user tunes to the channel "mch 2" for broadcasting the test-listen data segments by carrying out a predetermined operation to the mobile station 10, the process of the mobile 10 proceeds to step Sa1. At step Sa1, the tuner 15 tunes to the channel "mch 2" and receives broadcast waves of the test-listen data segments from the broadcast wave receiving antenna 151.

Next, when proceeding to step Sa2, the mobile station 10 decodes the received test-listen data segments and outputs the resultant data segments to the external speaker such as a headphone as a voice signal. This enables the user to test-listen the characteristic parts of popular songs which are played repeatedly.

Next, when proceeding to step Sa3, the mobile station 10 comes into a standby state for accepting an operation of the request of the music delivery operations from the user. If the user carries out, when the user is listening the test-listen channel "mch 2" and while the desired popular song is broadcast, the operation of requesting the delivery operations of such popular song by pressing down a predetermined key of the mobile station 10, the mobile station detects the requesting operation and then the process thereof proceeds to next step Sa4.

When proceeding to the step Sa4, the mobile station 10 extracts the music song ID of the popular song from the test-listen data segments thereof, the test-listen data segment being received through the channel "mch 2", when the requesting operation is carried out by the user. That is, as shown in FIG. 7, since, in the test-listen data segments, a number of the music song IDs have been inserted in the music song data segments at very short time intervals, for example, 0.1 seconds etc., even if the requesting operations are carried out with an optional timing, it is possible to obtain the music song ID from the data stream of the test-listen data segments, provided that such requesting operations are carried out when the test-listen data segments of the desired popular songs are broadcast.

Next, when the process of the mobile station 10 proceeds to step Sa5, the mobile station prompts the user to select a destination to be delivered to which the music is to be delivered, by displaying a message or the like on the liquid crystal display part. Available destinations will be the mobile station 10 itself which has made a request or the STB 40 which is placed in the user's house or the like. The mobile station 10 stores, in the ROM 112, the mobile station ID as one's own address in the network, and it also registers in advance, in the EEPROM 114, the STBID of the STB 40 as a destination address other than the above one's own address. The user selects a desired destination, for example, by a predetermined one-touch key operation, thereby being able to specify either the mobile station ID or the STBID as the destination address corresponding to the selecting operation. Of course, it is possible to design such that, as one of the operations of selecting a destination to be delivered, the address of a desired destination can be directly input.

Next, when the process of the mobile station 10 proceeds to step Sa6, the mobile station 10 transmits a request signal to the delivery management server 60, the signal including one's own mobile station ID, the music song ID of the requested song obtained at the above step Sa4, the destination address specified at the above step Sa5, and the address of the delivery management server 60.

The request signal is transmitted to the delivery management server 60 via the mobile data communication network 20 and the fixed data communication network 30, and subsequently the music delivery operations corresponding to the requests therein would be carried out.

2) the case where the desired song is requested by accessing to the delivery management server 60.

Figure 13:
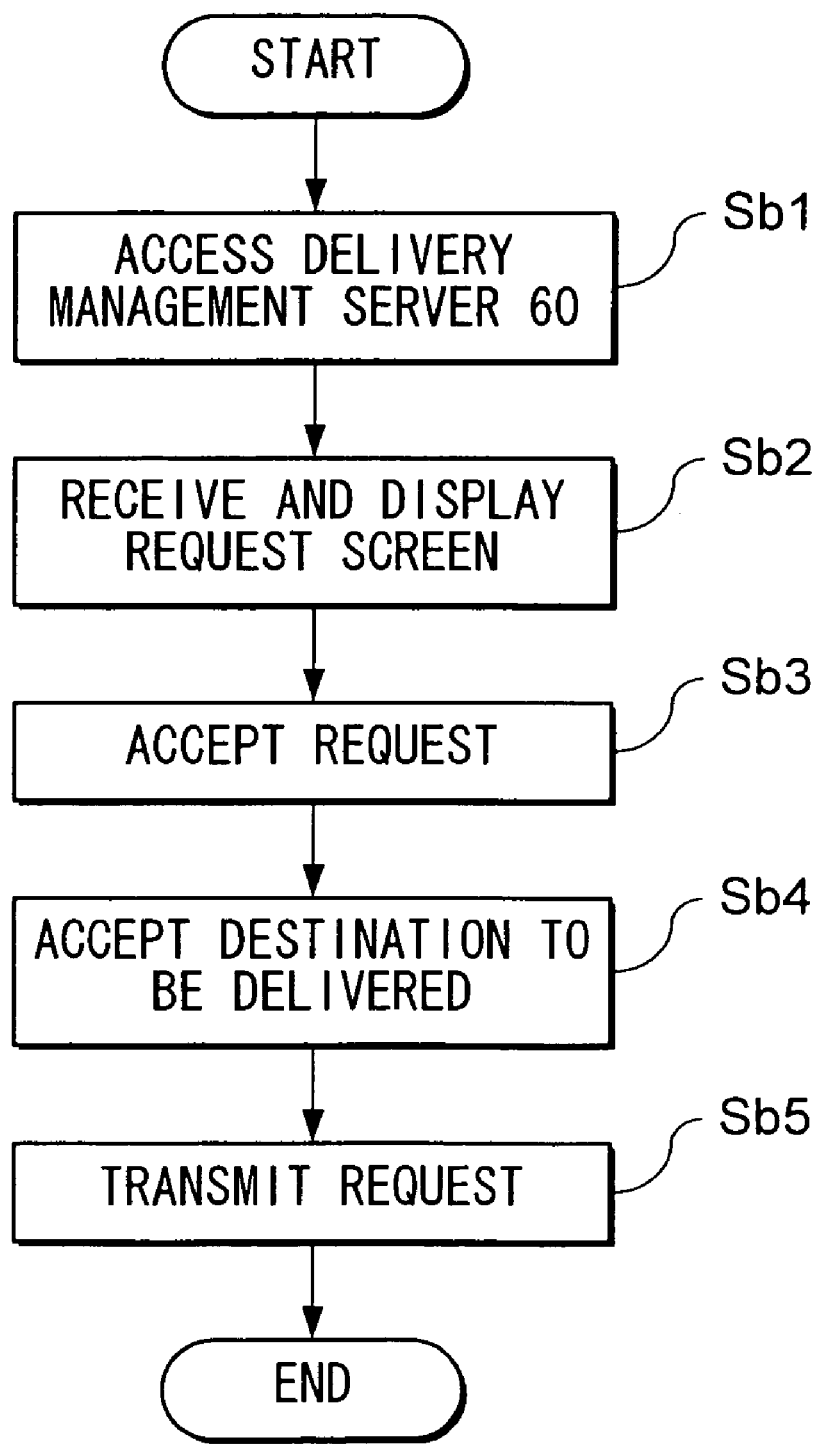
FIG. 13 is a flow chart illustrating an operation of the mobile station when accessing to the delivery management server so as to request a desired song in the first embodiment.

FIG. 13 is a flow chart illustrating an operation of the mobile station 11, when accessing to the delivery management server so as to request a desired song.

As shown in the figure, first, when the user instructs the mobile station 10 to connect itself to the delivery management server 60 by carrying out predetermined operation, the process of the mobile station 10 proceeds to step Sb1. At the step Sb1, the mobile station 10 specifies the address of the delivery management server 60 to access thereto, and requests to start a data communication by means of a predetermined protocol. This enables the mobile station 10 and the delivery management server 60 to make a data communication between them, and the process of the mobile station 10 proceeds to next step Sb2.

When proceeding to the step Sb2, the mobile station receives interactive screen data in the HTML (Hyper Text Markup Language) for prompting users to make a request of the music songs provided by the music delivery service, transmitted from the delivery management server 60, and based on the interactive screen data, the mobile station displays interactive screen for requesting music songs on the display part. Then, the process of the mobile station 10 proceeds to step Sb3, the mobile station 10 enters a standby state for accepting the request of music songs.

At step Sb3, the user selects a music song which the user wants to be delivered, by, for example, selecting one or more of the menu items in the interactive screen, thereby specifying a music song ID which has been embedded in advance in the interactive screen in connection with the selected menu item. Of course, it is possible to design a user interface so that the user can directly input a music song ID without utilizing the above system for selecting menu items.

Next, when proceeding to step Sb4, the user specifies the network address of a destination to which the requested music songs be delivered. As in the case of the above music song selection system, this operation can be carried out by accepting the request of the music songs with the use of the interactive screen to specify a destination address to be delivered, the destination address having been embedded in advance in the communication screen in connection with the menu items, or by directly inputting a destination address to be delivered.

Next, when proceeding to step Sb5, the mobile station 10 transmits a request signal to the delivery management server 60, the signal including one's own mobile station ID, the music song ID obtained at the above step Sb3, the address of the destination to be delivered obtained at the above step Sb4, and the address of the delivery management server 60.

Thus, the request signal is transmitted to the delivery management server 60 via the mobile data communication network 20 and the fixed data communication network 30, and subsequently the music delivery operations corresponding to the request can be carried out.

(2) Music Delivery Operation by the Delivery Management Server 60

Figure 14:
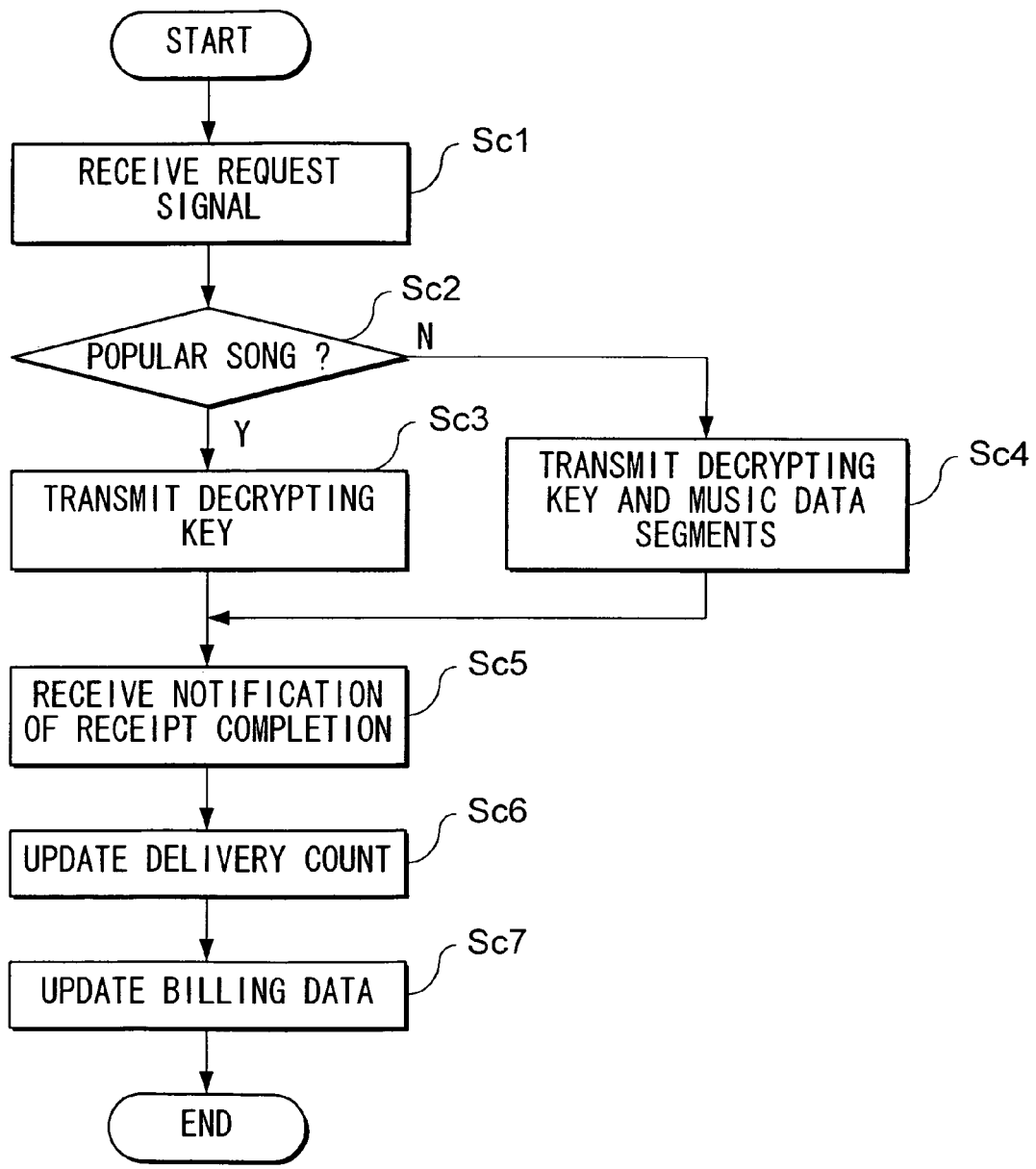
FIG. 14 is a flow chart illustrating music delivery operations carried out by the delivery management server according to the first embodiment.

FIG. 14 is a flow chart illustrating an operation of the music delivery carried out by the delivery management server 60. Referring now to the flow chart, the operation of the music delivery will be hereafter explained with reference to an exemplary case where a request for music songs is transmitted from the mobile station 10 and the music song data segments are delivered to the STB 40 in response to the request.

First, at step Sc1, when request signal for the music delivery operation is transmitted from the mobile station 10, the delivery management server 60 receives the request signal. The received request signal includes the mobile station ID indicating a mobile station 10 from which the request is originated, a music song ID selected by the user of the mobile station 10 and an address of the destination to be delivered.

Next, when proceeding to step. Sc2, the delivery management server 60 detects the music song ID included in the request signal. Then, the server determines as to whether the requested song corresponds to a popular or unpopular song. That is, if the music song ID included in the request signal has been registered in the popular song list table 67, the music song indicated by the music song ID is determined to correspond to a popular song, otherwise to an unpopular song.

If the result of the determination at the step Sc2 is a popular song, the process of the delivery management server 60 proceeds to step Sc3.

At the step Sc3, the delivery management server 60 refers to the decrypting key storing unit 63 by utilizing, as a retrieving key, the music song ID which is included in the request signal, the decrypting key being necessary for decrypting the requested music song data segments. The delivery management server 60 transmits only the decrypting key to the destination to be delivered, together with the music song ID, the destination being specified by the address of the destination included in the request signal. That is, if the address of the destination to be delivered corresponds to the mobile station ID of the mobile station 10, these are transmitted to the mobile station 10, and if such address is the STBID of the STB 40, these are transmitted to the STB 40. The reason why only the decrypting key is transmitted thereto is that, in the case of popular songs, the music song data segments themselves are received on the channel "mch1" of the broadcast station 70.

On the other hand, if the result of the determination at the above described step Sc2 is an unpopular song, the process of the delivery management server 60 proceeds to step Sc4.

At the step Sc4, the delivery management server 60 obtains the decrypting key just as in the case of the step Sc3, and it retrieves the music song DB 66 by utilizing, as a retrieving key, the music song ID included in the request signal, so as to obtain the music song data segments of the requested song. The delivery management server 60 transmits the obtained decrypting key and the music song data segments and the music song ID for the music song data segments to the destination to be delivered, the destination being specified by the address of the request signal. The reason why the music song data segments are transmitted as well as the decrypting key is that, in the case of unpopular songs which are not requested so frequently, the music song data segments are not provided on the channel mch1 of the broadcast station 70.

Upon the completion of either of the above described step 3 or step 4, the process of the delivery management server 60 proceeds to step Sc5.

At the step Sc5, the delivery management server 60 receives a notification of receipt completion from the mobile station 10 or the STB 40 which are the destinations to which the music song data segments have been delivered, the notification informing the completion of the receipt of the music song data segments.

When the delivery management server 60 receives the notification of receipt completion, the process thereof proceeds to step Sc6, in which it refers to the delivery counting table and increments the number of the delivery operations of the music songs of which delivery operations have been completed. This enables the server to produce the delivery log for each song and to determine as to whether each song corresponds to either the popular songs or the unpopular songs.

When proceeding to step Sc7, the delivery management server 60 sums up billing data for the subject delivery service to the billing data amount in the billing data storing unit 64.

(3) Receipt of the Music Song Data Segments

Figure 15:
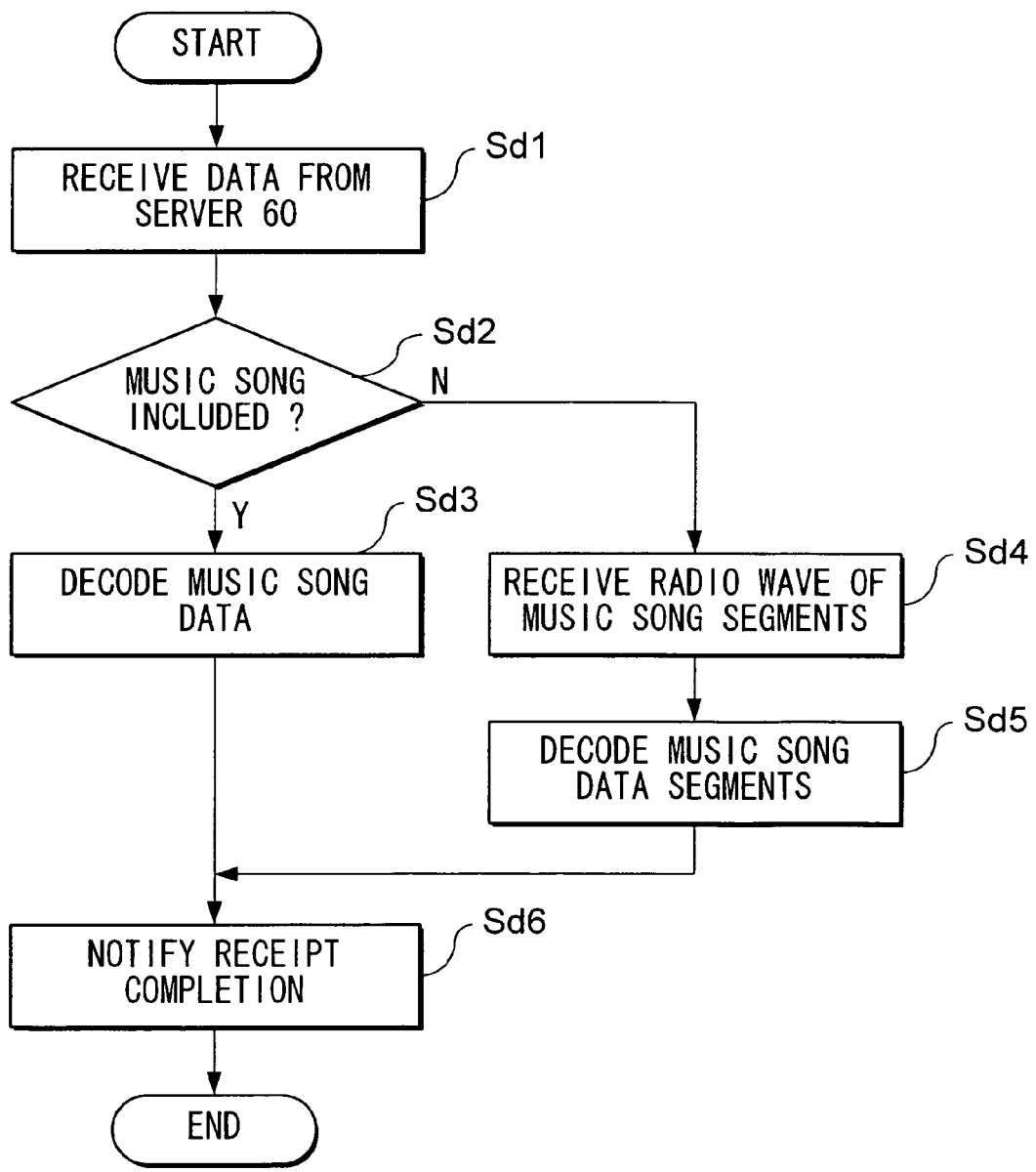
FIG. 15 is a flow chart illustrating an operation when the music song data segments are received by the mobile station and the STB according to the first embodiment.

Next, an operation of receiving the music song data segments by the mobile station 10 and the STB 40 will be explained. FIG. 15 is a flow chart illustrating the operation of receiving the music song data segments by the mobile station 10 or the STB 40. As the receiving algorithms for the mobile station 10 and the STB 40 are the same each other, only the receipt operation of the exemplary case of the STB 40 will be hereafter explained.

In FIG. 15, firstly, at step Sd1, the STB 40 receives the data segments which are transmitted from the delivery management server 60 at the above described step Sc3 or step Sc4. These data segments include, in the case of popular songs, the decrypting key and the music song ID and, in the case of unpopular songs, the music song data segments in addition to the decrypting key and the music song ID.

It is now assumed that the STB 40 placed in the user's house or the like is always switched on and stands by, so that it can receive the data segments whenever the data segments are transmitted thereto.

Next, when proceeding to step Sd2, the STB 40 determines as to whether or not the music song data segments are included in the received data segments.

When the determination at the above described step Sd2 results in "Yes", the process proceeds to step Sd3 so as to decrypt the received music song data segments by utilizing the decrypting key which is received together with the music song data segments, and the resultant decrypted data segments are stored in the hard disc unit 48.

On the other hand, if the determination at the above described step Sd2 results in "No", the process proceeds to step Sd4. The channel "mch1" through which the music song data segments of the popular songs are broadcast is tuned to receive the music song data segments which follow the music song ID received at the step Sd1.

The process now proceeds to step Sd5 in which the received music song data segments received at the above described step Sd4 are decrypted by utilizing the decrypting key received at the above described step Sd1, and the resultant decrypted data segments are stored in the hard disc unit 48.

Upon the completion of the process of the step Sd3 or Sd5, the process proceeds to step Sd6 in which the signal of the notification of receipt completion is transmitted to the delivery management server 60 so as to report the completion of the receipt of the music song data segments.

Although the above described receipt operation has been explained with reference to the exemplary case where the STB 40 has been specified as the destination to be delivered, the operation in the case where the mobile station 10 is intended to be as such destination is just the same as above, except that the storage to which the music song data segments be stored becomes the EEPROM 14.

Thus, in the first embodiment, in the case of popular songs, it is possible to test-listen the popular songs and to request the delivery of the music song data segments therefor by utilizing the mobile station 10, so that the music song data segments can be downloaded to desired destinations to be delivered utilizing the broadcast waves, at a relatively low communication cost. On the other hand, in the case of unpopular songs, it is possible to access the delivery management server 60 in order to request desired songs by utilizing the mobile station 10, so that the music song data segments for desired songs can be downloaded to a desired destination to be delivered via the communication network. This enables the user to request desired songs anywhere and anytime and to download them to the desired destination to be delivered via an appropriate communication medium.

B: SECOND EMBODIMENT

Next, the second embodiment of the present invention will be explained.

Figure 16:
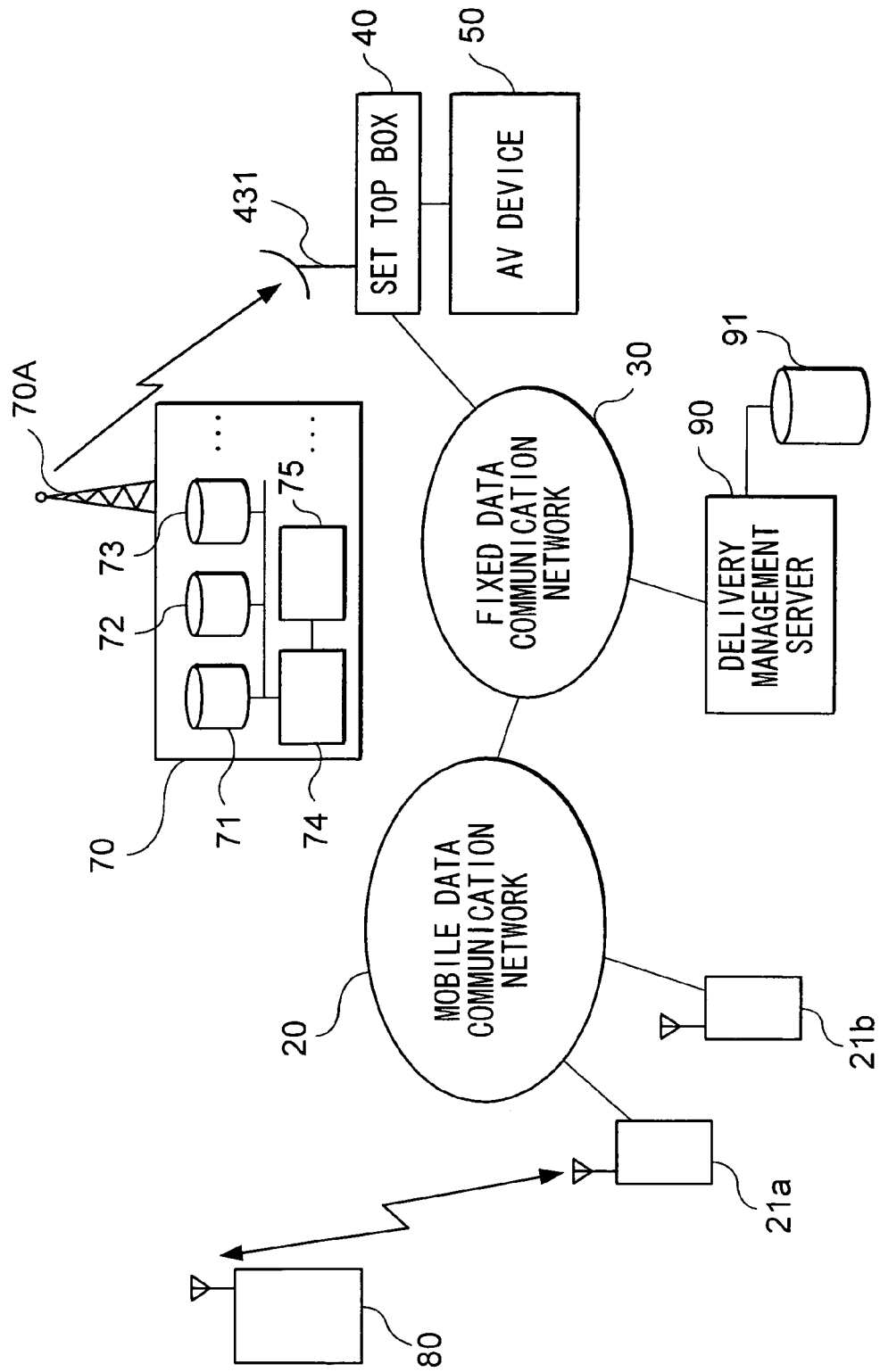
FIG. 16 is a block diagram showing a configuration of an entire information delivery system according to a second embodiment of the present invention.

FIG. 16 is a block diagram showing a configuration of the entire information delivery system according to a second embodiment. In the figure, the same members as those in the above described first embodiment are indicated by the same reference numerals as those shown in FIG. 1.

The differences between the second embodiment shown in FIG. 16 and the first embodiment shown in FIG. 1 resides in the configurations of the mobile station 80 and the delivery management server 90.

That is, the mobile station 80 does not comprise a component for receiving the broadcast waves supplied from the broadcast station 70. To be more specific, the mobile station 80 lacks the tuner 15 and the broadcast wave receipt antenna 151 shown in FIG. 10. Therefore, the mobile station 80 receives all data segments on the music delivery operations via the mobile data communication network 20.

Also, in addition to the configuration of the first embodiment shown in FIG. 8, the delivery management server 90 comprises a test-listen DB 91 for storing the test-listen data segments. The test-listen DB 91 has the same contents as those in the test-listen DB 73 which is provided in the broadcast station 70 explained in the first embodiment, and the test-listen DB is created based on the data provided from the broadcast station 70.

As described above, because the mobile station 80 can not receive the broadcast waves supplied from the broadcast station 70, all operations including the test-listening operation of the popular songs and the downloading operation of the music song data segments therefor must be done by accessing to the delivery management server 90.

In other words, when the user wants to test-listen popular songs, he accesses to the delivery management server 90 to select a menu item for providing the test-listen operations of popular songs. Subsequently, the delivery management server 90 reads data segments from the test-listen DB 91 to deliver them to the mobile station 80 by utilizing a data stream similar to that on the channel "mch 2" shown in FIG. 7. The mobile station 80 allows the user to test-listen the popular songs by reproducing the delivered test-listen data segments.

The following operations including the operation of requesting the songs and the operation of downloading the music song data segments therefor are different from those of the first embodiment in the steps Sc2 to Sc4 shown in FIG. 14.

That is, in the first embodiment, the delivery management server 60 is adapted to determine, at the step Sc2, as to whether the requested song correspond to either popular songs or unpopular songs, and if it corresponds to the popular songs, the delivery management server delivers, at the step Sc3, only the decrypting key to the specified destination to be delivered, and if it corresponds to the unpopular songs, the delivery management server delivers, at the step Sc4, the decrypting key and the music song data segments to the destination.

On the other hand, in the second embodiment, as the delivery management server 90 can not receive the broadcast waves, it determines, at the step Sc2, as to whether the specified destination to be delivered is either the mobile station 80 or the STB 40 in addition to the determination as to whether the requested song corresponds to either popular songs or unpopular songs. If the requested song corresponds to the popular songs and the destination is the STB 40, the process of the delivery management server proceeds to the step Sc3, otherwise to the step Sc4. As a result, the operations of the STB 40 becomes the same as those in the first embodiment, but the mobile station 80 is adapted to download all the data segments, not depending on the popular songs or the unpopular songs, through communication between itself and the delivery management server 90.

Therefore, in the second embodiment, it is possible, not depending on popular songs or unpopular songs, to access the delivery management server 60 in order to request a desired song by utilizing the mobile station 10, so that the music song data segments can be obtained at a desired destination to be delivered. Also, as for popular songs, it is possible to access the delivery management server 90 by utilizing the mobile station 80 to test-listen such popular songs.

In addition, in contrast to the first embodiment, since, in the second embodiment, it is not necessary to provide the mobile station with the configuration for receiving broadcast waves, the mobile station can be made compact and lightweight.

C: MODIFICATIONS

As described above, the present invention is not limited to the above described embodiments, but various modifications will be made as follows:

C-1: Configurations of the Fixed Data Communication Network 30 and the Broadcast Operation The fixed data communication network 30 may be the communication network such as the Internet in addition to the exemplary ISDN in the embodiments. Also, although in the embodiments the ground wave digital broadcast has been considered for the broadcast type, the present invention is not limited thereto but may be possible to adopt the digital satellite broadcast type utilizing, for example, the BS (Broadcasting Satellite), CS (Communication Satellite) or the like.

C-2: Configurations of the Broadcast Station 70 and Delivery Management Server 60 or 90

In the embodiments, instead the broadcast station 70, the delivery management server 60 or 90 has been considered to manage the delivery operation of the music song data segments. However, the present invention is not limited to such configuration.

For example, it may be possible to provide the server system 75 in the broadcast station 70 with the functions of the delivery management server 60 or 90, so as to carry out the delivery management operation in addition to the broadcast operation.

That is, how the functions of the information delivery operations should be assigned to the nodes on the network such as the broadcast station 70 and the delivery management server 60 or 90 can be optionally selected in consideration of the efficiencies and the loads of the processes or the like. Therefore, the present invention will not be limited to the network configuration of the embodiments.

C-3: Configuration of the Mobile Station 10

In the embodiments, although the mobile station having a conversation function such as portable telephones has been explained for example, the present invention is not limited thereto, but be applicable to portable information terminals such as the PHS (Personal handyphone System) used as the data communication dedicated terminal and the PDA (Personal Digital Assistants) having a radio data communication function.

C-4: Methods of Specifying the Destinations to be Delivered

In the embodiments, although the destination to which the music song data segments be delivered is intended to be specified by the user, the present invention is not limited to such method.

As for the first embodiment, it may be possible for the delivery management server 60 to determine destinations to be delivered depending on the residual amount of the memory of the mobile station 10. The following is an example.

The mobile station 10 monitors the residual amount of its own memory (free space in the EEPROM 14), and when transmitting a request signal for music delivery to the delivery management server 60, information on the residual amount the memory is added to the request signal. Next, the delivery management server 60, having information on the data amount of the music song data for each song, compares the value of the residual amount of the memory which has been received together with the request signal with the data amount of the music song data to be delivered. If the residual amount of the memory is larger than the data amount of the music song data, the delivery management server decides the mobile station 10 as the destination to be delivered, and if smaller, deciding the STB 40 as such destination. In this way, it is possible to prevent the mobile station 10 from not capable of receiving the delivered music song data segments due to the small residual amount of the memory of the mobile station 10. It is assumed that, in the above described example, there is always a sufficient free space in the hard disk unit 48 of the STB 40.

Also, the above modification may be applied not only to the first embodiment, but to the second embodiment in a like manner.

Further, when a user specifies, by means of the mobile station 10, the STB 40 as the destination to be delivered, the request signal transmitted from the mobile station 10 may be transmitted to the delivery management server 60 via the STB 40. That is, it may be possible to design the present invention such that the mobile station 10 transmits the request signal to the STB 40 and, upon the receipt of the request signal, the STB 40 transmits another request signal to the delivery management server 60 with an indication that the destination to be delivered is the STB.

C-5: Configurations of the Information to be Delivered

In the embodiments, although it is assumed that the contents to be delivered are music data segments, the present invention is not limited thereto, but it may be possible to design the present invention such that other contents such as movies, game software, electronic books and the news can be delivered. In this case, if guide information to be provided is picture contents such as movies instead test-listen data segments as described in the above embodiments, it may be possible to provide, as the guide information, pictures contents produced by extracting characteristic scenes or text data segments of the producers and casts.

Further, even where music delivery operations are carried out, it may be possible to provide, by utilizing the broadcast operation or the communication operation, text data segments and picture data segments for guiding music songs, these data segments being used as an guide information in place of test-listen data segments or additional information to the test-listen data segments.

C-6: Configuration of the STB 40

Figure 17:
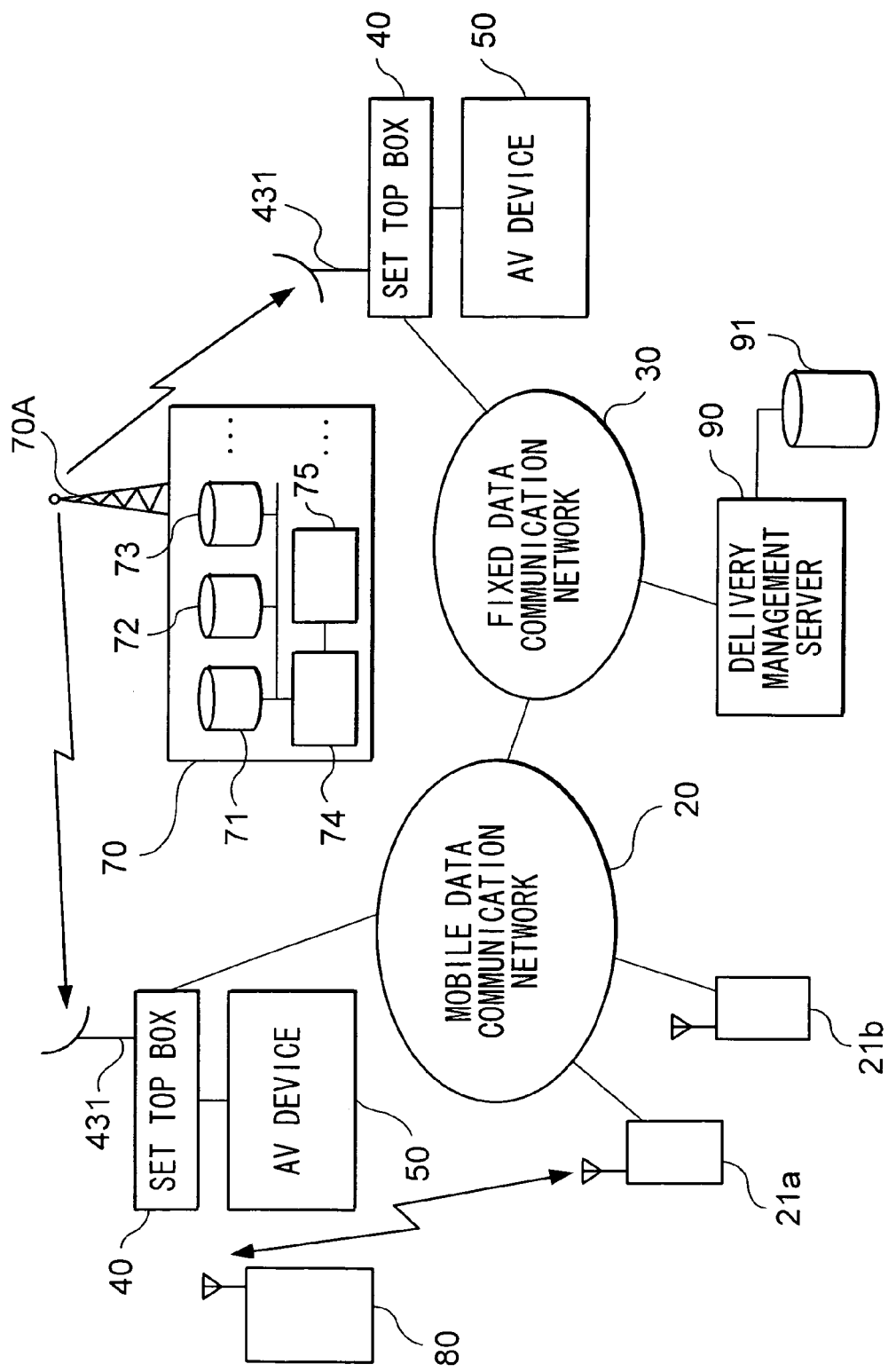
FIG. 17 is a block diagram showing a configuration of an entire information delivery system according to modifications of the present invention.

In the embodiments, the case where the STB 40 is connected to the fixed data communication network 30 has been explained. However, the present invention is not limited to such configuration, but may be a configuration in the exemplary FIG. 17, in which the STB 40 is served by the mobile data communication network 20 (or another mobile data communication network other than the mobile data communication network 20, which is capable of making a mutual data communication between itself and the mobile data communication network 20). In this case, for example, the configuration of the STB 40 may be the one which has a wireless data communication interface with the mobile data communication network as the mobile station 80 (or the mobile station 10 shown in FIG. 1) has or a data communication interface for connecting itself to the mobile station 80 (or the mobile station 10 shown in FIG. 1). Thus, the term "information receiving terminal" in claims covers a wide concept including the STB 40 configured in the above manner, or the mobile communication terminals or the like to which information is to be delivered.

The invention claimed is:

1. An information delivery system comprising:
   a database that stores a first content item having a high frequency of requests and a second content item having a lower frequency of requests;
   a broadcast station that broadcasts the first content item by utilizing broadcast waves;
   a mobile communication terminal served by a mobile communication network; and
   a delivery management server that, in response to a request for delivering information received from the mobile communication terminal, determines whether a requested content item comprises the first content item or the second content item stored in the database, and when the requested content item comprises the first content item, transmits only related information of the requested content item to the mobile communication terminal, and when the requested content item comprises the second content item, transmits at least the requested content item to the mobile communication terminal.

2. The information delivery system of claim 1 wherein the delivery management server transmits a decryption key for the first content item as related information when the requested content item comprises the first content item without transmitting the first content item.

3. The information delivery system of claim 1 wherein the delivery management server transmits the requested content item and related information of the requested content item when the requested content item comprises the second content item.

4. The information delivery system of claim 3 wherein the delivery management server transmits a decryption key for the second content item as the related information of the requested content item.

5. The information delivery system of claim 1 wherein the first content item comprises a song of a first song type and wherein the delivery management server transmits a decryption key for the song of first song type as the related information, the decryption key to be received by the mobile communication terminal and used by the mobile communication terminal to decrypt the song of the first song type broadcast by the broadcast station.

6. The information delivery system of claim 5 wherein the second content item comprises a song of a second song type and wherein the delivery management server transmits a decryption key for the song of the second song type and the song of the second song type, the song of the second type to be received by the mobile communication terminal and the decryption key to be used by the mobile communication terminal to decrypt the song of the second song type.

7. A mobile communication terminal operative in conjunction with a mobile communication network, the mobile communication terminal comprising:
    radio circuitry configured to transmit a request for delivering information stored in remote database over the mobile communication network, the request specifying a requested content item which is a first content item having a high frequency of requests or a second content item having a lower frequency of requests, the radio circuitry further configured to receive transmissions which include only related information of the requested content item when the requested content item is the first content item and to receive transmissions including at least the requested content item when the requested content item comprises the second content item.

8. The mobile communication terminal of claim 7 wherein the radio circuitry comprises:
    a wireless communication unit to transmit the request and to receive the related information; and
    a tuner to receive broadcast waves of a broadcast of the first content item.

9. The mobile communication terminal of claim 8 wherein the wireless communication circuit is operative to receive a decryption key for the first content item as the related information when the requested content item comprises the first content item, the decryption key for decrypting the first content item received by the tuner.

10. The mobile communication terminal of claim 8 wherein the user interface is further operative to be actuated by the user to select a network address of a destination to which the selected information is to be delivered.

11. The mobile communication terminal of claim 8 wherein the radio circuitry is operative to transmit a request signal which includes identification information for the mobile communication terminal and information about the information is to be delivered selected by the user.

12. The mobile communication terminal of claim 11 wherein the radio circuitry is operative to transmit a request signal which further includes an address of a delivery management server.

13. The mobile communication terminal of claim 7 further comprising:
    a user interface operative to prompt a user to select information to be delivered and to be actuated by the user to select the information to be delivered to the mobile communication terminal.

14. A method for receiving selected information at mobile communication terminal operative in conjunction with a mobile communication network, the method comprising:
    receiving from a user of the mobile communication terminal a selection of a requested content item, the requested content item which is stored in a remote database accessible over the mobile communication network, the requested content item being a first content item having a high frequency of requests or a second item having a lower frequency of requests;
    transmitting a request for delivering information, the request specifying the requested content item;
    receiving transmissions which include only related information of the requested content item when the requested content item is the first content item; and
    receiving transmissions including at least the requested content item when the requested content item comprises the second content item.

\* \* \* \* \*